United States Patent Office 3,089,873
Patented May 14, 1963

3,089,873
16α-ALKOXYCORTICOIDS
Elliot L. Shapiro, Irvington, and Hans Reimann, Bloomfield, N.J., assignors to Schering Corporation, Bloomfield, N.J., a corporation of New Jersey
No Drawing. Filed Mar. 12, 1959, Ser. No. 798,819
16 Claims. (Cl. 260—239.55)

This invention relates to a new series of physiologically active steroid derivatives and is more particularly concerned with the provision of certain unique 16α-alkoxy-substituted steroids which possess chemotherapeutic utility in the treatment of rheumatoid arthritis and similar inflammatory disorders, as well as related steroidal compounds of the general class defined which form valuable intermediates for use in the production of the anti-inflammatory agents of the invention among other possible synthetic steroids.

It is now well established that the efficiency of the early steroidal therapeutic agents such as cortisone and hydrocortisone can be enhanced substantially through modification of the structures of these hormones in such a manner as to reduce or delay inactivation of the molecules, believed to be promoted by natural mechanisms in the human body. To this end, past efforts have resulted in the provision of the $\Delta^{1,4}$ and $\Delta^{1,4,6}$ derivatives, C-9 halogenated and C-6,9 dihalogenated derivatives, C-2 and C-6 methylated analogs, C-14 and C-16 hydroxylated derivatives, C-16 methylated derivatives, and combinations of these analogous structures, among other compounds of somewhat lesser importance. Significantly, while certain of the above-enumerated compounds have demonstrated enhanced anti-inflammatory activity, at least some have also evidenced untoward side effects such as increased salt retention and edema-producing characteristics, disturbances in estrogenic and androgenic activity, loss of bone calcium, ulcerogenesis, potassium loss, etc. Of particular interest from the standpoint of present research efforts are the salt and water retention characteristics induced through use of several of the otherwise most efficacious anti-inflammatory agents available today including, for example, the 9α-halo corticoids.

The present invention is based, in part, on our discovery that the 16α-alkoxy substituents serve to reduce or eliminate the undesirable side effects of salt and water retention common to several of the more potent anti-inflammatory steroids, thereby converting these derivatives into useful and valuable chemotherapeutic agents for the treatment of arthritis and other inflammatory conditions. It is additionally postulated that the presence of the 16α-alkoxy groups serves to a limited extent to stabilize or screen the active centers of the steriod molecules against metabolic breakdown, thereby further enhancing the normal anti-inflammatory activity of our products through protracted or sustained existence of the same within the body. In the same manner, the reduction in chemical reactivity to be expected at C-20, for example, by reason of the 16α-alkoxy substituents, renders the compounds of the invention independently useful as intermediates in the production of other steroidal derivatives.

The unique compounds of our invention may be represented in general by the following formulae:

(A) 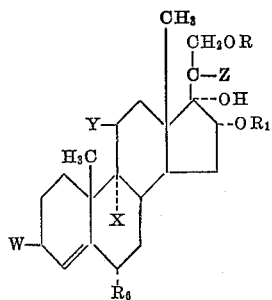

(B) 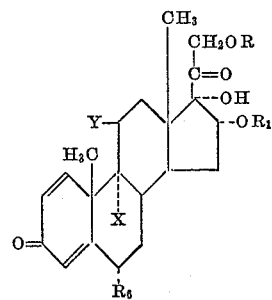

and (C) 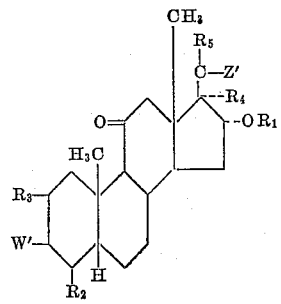

wherein W and Z are common members selected from the group consisting of oxygen and the semicarbazono radical; W' is a member selected from the group consisting of oxygen, hydroxy and acetoxy; X is a member selected from the group consisting of hydrogen, bromine, chlorine and fluorine atoms; Y is a member selected from the group consisting of oxygen, hydroxy, hydrogen—in which case the C-9:C-11 bond is olefinic and replaces X, and an epoxy radical having one valence linked to C-9 and also replacing X; Z' is a member selected from the group consisting of oxygen, cyanohydrin, and cyano—in which case the C-17:C-20 bond is olefinic and replaces $R_4$; R is a member selected from the group consisting of hydrogen and lower acyl radicals; $R_1$ is a lower alkyl radical; $R_2$ and $R_3$ are each members selected from the group consisting of hydrogen and bromine; $R_4$ is a member selected from the group consisting of hydrogen and hydroxy; $R_5$ is a member selected from the group consisting of methyl and acyloxymethylene radicals; and $R_6$ is a member selected from the group consisting of hydrogen, halogen and lower alkyl.

The foregoing compounds may be prepared by various different routes of synthesis. In general, however, the preparatory techniques involve the addition of lower aliphatic alcohols, such as methanol, ethanol, butanol, propanol and isomeric forms of such alcohols, to suitable 16-dehydro-20-oxo steroids to yield the corresponding 16α-alkoxy-substituted steroids. The latter compounds are then subjected to further reactions for their protected conversion to the useful steroid derivatives depicted by the foregoing formulae. While the reactions involved in the production of our compounds are described hereinafter with particular reference to the use of methanol for introduction of the methoxy group in α-orientation to the C-16 carbon atom, it is to be understood that the alkoxy substituent is a direct function of the particular alcohol employed, and that all of the usual aliphatic alcohols can be used interchangeably in the basic reaction mechanisms of the invention.

By way of illustration of the general methods applicable to the production of the unique compounds of the invention, the 16-en-20-one group of the compound 11,20-dioxo-5β-pregn-16-en-3α-yl acetate may be treated with methanol, for example, in the presence of a suitable acidic or basic catalyst, and with or without an inert solvent medium such as tetrahydrofuran, to derive the corresponding 16α-methoxy-3α-hydroxy-5β-pregnane-11,20-dione which is then esterified with acetic anhydride in conventional manner to obtain the corresponding 3-acetate. Treatment of the latter compound with hydrogen cyanide in alcohol yields the intermediate 16α-methoxy-20-cyano-20-hydroxy-11-oxo-5β-pregnan-3α-yl acetate which can be converted, in turn, to 16α-methoxy-20-cyano-11-oxo-5β-pregn-17(20)-en-3α-yl acetate by means of a suitable dehydrating agent such, as for example, phosphorus oxychloride in pyridine at mild temperatures of the order of 10–60° C. Upon treatment of the latter intermediate with an oxidizing agent such as osmium tetroxide in the presence of pyridine or potassium permanganate and in a solvent such as acetone containing piperidine, followed by alkaline hydrolysis, one derives the corresponding 16α-methoxy-3α,17α-dihydroxy-5β-pregnane-11,20-dione derivative. Treatment of the latter compound with bromine followed by exchange with acetate ion yields 16α-methoxy-3α,17α-dihydroxy-11-oxo-5β-pregnan-21-yl acetate, which is then oxidized to the corresponding 3-ketone with chromic acid or other suitable agents such as N-bromosuccinimide and N-bromoacetamide. Bromination of the 3-ketone with one mole of bromine followed by dehydrohalogenation either with a suitable base such as collidine, lutidine, dimethylformamide, etc., or reaction with semicarbazide followed by pyruvic acid treatment yields the 16α-methoxy-17α-hydroxy-3,11,20-trioxo-4-pregnen-21-yl acetate (16α-methoxy-cortisone 21-acetate).

The corresponding prednisone derivative, 16α-methoxy-17α-hydroxy-3,11,20-trioxo-1,4-pregnadien-21-yl acetate may be prepared by subjecting the 16α-methoxy-17α-hydroxy-3,11,20-trioxo-4-pregnen-21-yl acetate to biochemical synthesis consisting of fermentation in the presence of the microorganism Corynebacterium simplex (A.T.C.C. 6946), or by reacting 16α-methoxy-17α-hydroxy-3,11,20-trioxo-5β-pregnan-21-yl acetate with 2 moles of bromine followed by dehydrohalogenation with a suitable base such as collidine, lutidine, or dimethylformamide.

Hydrolysis of 16α-methoxy-17α-hydroxy-3,11,20-trioxo-4-pregnen-21-yl acetate (16α-methoxycortisone 21-acetate) or 16α-methoxy-17α-hydroxy-3,11,20-trioxo-1,4-pregnadien-21-yl acetate (16α-methoxyprednisone 21-acetate) with either base or acid yields the corresponding 16α-methoxycortisone and 16α-methoxyprednisone, respectively. The latter compound may be obtained also by microbiological oxidation of 16α-methoxy-17α-hydroxy-3,11,20-trioxo-4-pregnen-21-yl acetate with the microorganism Bacillus sphaericus var. fusiformis (A.T.C.C. 7055).

The compound 16α-methoxy-11β,17α,21-trihydroxy-4-pregnene-3,20-dione (i.e. 16α-methoxyhydrocortisone) may also be prepared by various routes of synthesis. One such procedure consists of forming the intermediate 16α-methoxy-3,20-bis(ethylenedioxy)-17α,21-dihydroxy-5-pregnene-11-one by treatment of 16α-methoxy-17α,21-dihydroxy-4-pregnene-3,11,20-trione (16α-methoxycortisone) with ethylene glycol in the presence of a suitable catalyst such as para-toluenesulfonic acid, with or without an inert solvent medium such as benzene. Reduction of the oxo-group at C-11 in the latter compound with a suitable reducing agent such as lithium aluminum hydride yields the corresponding 11β-hydroxy compound. Hydrolysis of this compound with a suitable acid reagent such as acetic acid, or sulfuric acid in methanol provides the desired 16α-methoxy-11β,17α,21-trihydroxy-4-pregnene-3,20-dione.

Still another procedure consists of the formation of the intermediate 16α-methoxy-3,20-bis(semicarbazono)-17α,21-dihydroxy-4-pregnene-11-one by the reaction of 16α-methoxy-17α,21-dihydroxy-4-pregnene-3,11,20-trione with semicarbazide. In this manner, the sensitive 3,20-dioxo groups are protected so that the 11-oxo function can be reduced with sodium or potassium borohydride in aqueous tetrahydrofuran to yield the 16α-methoxy-3,20-bis(semicarbazono)-4-pregnene-11β,17α-21-triol. Thereafter, the 3,20-dioxo functions are regenerated in conventional manner as, for example, by means of pyruvic acid, or by hydrolytic procedures involving use of dilute hydrochloric acid or nitrous acid. Acetylation of the foregoing compound yields the corresponding 16α-methoxyhydrocortisone 21-acetate.

Microbiological dehydrogenation of the latter compound with the microorganism Corynebacterium simplex (A.T.C.C. 6949) yields 16α-methoxy-11β,17α-dihydroxy-3,20-dioxo-1,4-pregnadien-21-yl acetate (16α-methoxy-prednisolone 21-acetate). Alternatively, microbiological dehydrogenation of the 16α-methoxyhydrocortisone with either of the microorganisms Corynebacterium simplex (A.T.C.C. 6949) or Bacillus sphaericus var. fusiformis (A.T.C.C.) provides 16α-methoxy-11β,17α-21-trihydroxy-1,4-pregnadiene-3,20-dione (16α-methoxyprednisolone) which upon esterification in conventional fashion yields the corresponding 21-acetate compound.

By treating the 16α-methoxy-11β,17α-dihydroxy-3,20-dioxo-1,4-pregnadien-21-yl acetate with a sulfonyl chloride such as methanesulfonyl chloride in a solvent such as pyridine or dimethylformamide one obtains 16α-methoxy-17α-hydroxy-3,20-dioxo-1,4,9(11)-pregnatrien-21-yl acetate. This compound upon treatment with N-bromoacetamide in the presence of water and a strong acid catalyst such as perchloric acid provides the 9α-bromo-16α-methoxy-11β,17α-dihydroxy-3,20-dioxo-1,4-pregnadien-21-yl acetate. Treatment of the latter compound with a base such as sodium acetate in acetone or ethanol provides 9β,11β-epoxy-16α-methoxy-17α-hydroxy-3,20-dioxo-1,4-pregnadien-21-yl acetate, which upon treatment with hydrogen chloride or hydrogen fluoride yields, respectively, 9α-chloro- and 9α-fluoro-16α-methoxy-11β,17α-dihydroxy-3,20-dioxo-1,4-pregnadien-21-yl acetates. These compounds may be converted to the corresponding 11-oxo derivatives by treatment with a suitable oxidizing agent as, for example, chromic acid.

By a sequence of reactions similar to those outlined above, 16α-alkoxy-11β,17α-dihydroxy-3,20-dioxo-4-pregnen-21-yl acetates (16α-alkoxyhydrocortisone 21-acetates) may serve as the precursors for the corresponding 9α-halo-substituted 16α-alkoxyhydrocortisones and 16α-alkoxycortisone analogues. Of course, any of the 21-acetates described hereinbefore may be converted to the 21-alcohol steroids by mild acidic hydrolysis. The alcohols thus produced may be converted to useful esters by treatment with a suitable acid chloride or acid anhydride in a solvent such as pyridine. Useful esters include, for example, the acetate, propionate, isovalerate, enanthate, tertiary-butyl acetate, cyclopentylpropionate, phenoxyacetate and substituted phenoxyacetates, furoate and substituted furoates. Other valuable ester derivatives include water-soluble compounds such as monosodium succinate, phthalate, sulfobenzoate, phosphate, sulfate as well as glycinate salts and gluconates.

As will appear readily to the skilled observer, the preparation of the 16α-alkoxy steroids identified by formulae A, B and C above is not restricted to the procedures outlined hereinbefore. Considering the methoxy derivatives again for purposes of illustration, the intermediates 16α-methoxy - 17α - 21 - dihydroxy-4-pregnene-3,20-dione and 16α - methoxy -17α, 21 - dihydroxy-1,4-pregnadiene-3,20-dione are useful intermediates for the syntheses of such compounds. These compounds may be obtained from 3β-hydroxy-5,16-pregnadiene-20-one by reactions similar to those outlined above. Thus, 16-dehydro-pregnenolone, which may be obtained from diosgenin, is treated with methanol in the presence of acid or base and is then esterified to yield 16α-methoxy-20-oxo-5-pregnen-3β-yl acetate. Reaction with hydrogen cyanide, followed by dehydration with phosphorus oxychloride and subsequent treatment with an oxidizing agent such as osmium tetroxide as described hereinbefore yields 16α-methoxy-3β,17α-dihydroxy-5-pregnene-20-one. Bromination of the latter compound followed by treatment with sodium iodide and then potassium acetate yields the compound 16α - methoxy - 3β,17α-dihydroxy-20-oxo-5-pregnen-21-yl acetate. By subjecting the latter compound to the action of the microorganism *Flavo bacterium dehydrogenans* var. *hydrolyticum* in a manner analogous to that described in Republic of South Africa Patent No. 3462/55, one obtains the compound 16α-methoxy-17α,21-dihydroxy-4-pregnene-3,20-dione which, upon treatment with *Corynebacterium simplex* (A.T.C.C. 6946) is transformed into the analogous Δ¹-derivative.

The foregoing intermediates upon being subjected to C–11 microbiological hydroxylating organisms capable of introducing an 11β-hydroxy substituent as, for example, *Curvularia lunata* (Q.M. 120 h) yield directly 16α-methoxy-hydrocortisone and 16α-methoxyprednisolone. In addition, the same intermediates upon being subjected to microbiological hydroxylating organisms such as *Delacroixia coronata* which is capable of introducing an 11α-hydroxy substituent, yield 16α-methoxy-11α,17α,21-trihydroxy-4-pregnene-3,20-dione and the corresponding Δ¹ analogue. These 11α-hydroxy intermediates may be esterified selectively with 1 mole of acetic anhydride with or without a base such as pyridine to produce the corresponding 21-acetates. Treatment, in turn, of these monoacetates with methane-sulfonyl chloride yields the 11α-mesylate which may be treated with sodium acetate in acetic acid to eliminate methanesulfonic acid with production of the above-mentioned 16α-methoxy-17α-hydroxy-3,20-dioxo-4,9(11)-pregnadien-21-yl acetate and 16α - methoxy-17α-hydroxy-3,20-dioxo-1,4,9(11)-pregnatrien-21-yl acetate.

In addition to diosgenin as mentioned above, smilagenin is also useful as a starting material in the preparation of the novel compounds of our invention. Other important starting materials include the 12-oxygenated sapogenins, such as hecognenin, rockogenin, and gentrogenin. For example, hecogenin has been converted to 3β-hydroxy-16-dehydro-5α-pregnane-11,20-dione. A 16α-alkoxy substituent can be introduced on this compound by means of the desired alcohol and an acid or base catalyst. The side chain can then be elaborated as described above, and the A-ring modified in conventional manner to yield the Δ⁴- or Δ¹,⁴- double bond(s) as well as the characteristic 3-oxo-substituent.

Another useful intermediate for the preparation of the compounds depicted hereinbefore is 11β-hydroxy-3,20-dioxo-4,16-pregnadien-21-yl acetate. A typical synthesis utilizing this intermediate is the following:

Treatment of the foregoing compound with 2-methyl-2-ethyl-1,3-dioxolane in an inert solvent such as benzene and a catalytic amount of para-toluenesulfonic acid yields 3-ethylenedioxy - 11β - hydroxy-20-oxo-5,16-pregnadien-21-yl acetate. Reaction of the latter compound with methanol and a base such as potassium hydroxide yields the corresponding 16α-methoxy-substituted 21-hydroxy compound which, upon treatment with acetic anhydride and pyridine in conventional fashion, yields 3-ethylenedioxy-16α-methoxy - 11β - hydroxy-20-oxo-5-pregnen-21-yl acetate. Treatment of the latter intermediate with hydrogen cyanide followed by phosphorus oxychloride and pyridine yields the compound 3-ethylenedioxy-20-cyano-16α-methoxy - 5,9(11),17(20) - pregnatrien-21-yl acetate. When the latter compound is reacted with potassium permanganate in the manner outlined above, and thereafter subjected to alkaline hydrolysis, and subsequent acetylation there is produced the intermediate 3-ethylene-dioxy - 16α - methoxy - 17α - hydroxy - 20 - oxo-5,9(11)-pregnadien-21-yl acetate. Reaction of the latter compound with aqueous acetic acid yields 16α-methoxy-17α-hydroxy-3,20-dioxo-4,9(11)-pregnadien-21-yl acetate one of the compounds disclosed hereinbefore as obtained by a different route of synthesis.

In addition to the microbiological hydroxylation at C–11 as outlined above, one may also employ this technique for introduction of a 17α-hydroxy group on a number of 16α-methoxy corticosteroids with or without 9α-halogen substitutents. For example, if one treats 3-ethylenedioxy-16α-methoxy - 11β - hydroxy - 20 - oxo-5-pregnen-21-yl acetate, previously described above, with aqueous acetic acid, one obtains 16α-methoxy-11β-hydroxy-3,20-dioxo-4-pregnen-21-yl acetate (16α-methoxy-corticosterone 21-acetate) which, after hydrolysis of the C–21 acetate function, is hydroxylated at C–17 with the microorganism *Cephalothecium roseum* Cda. (A.T.C.C. 8685) whereby one obtains 16α-methoxy-17α-, 11β,21-trihydroxy-4-pregnene-3,20-dione.

Further illustrative of the foregoing procedure, one may employ the above 16α-methoxy-11β-hydroxy-3,20-dioxo-4-pregnen-21-yl acetate as an intermediate for the preparation of 9α-fluoro-16α-methoxy-11β-hydroxy-3,20-dioxo-1,4-pregnadien-21-yl acetate in a manner similar to that described hereinbefore. Thus, microbiological dehydrogenation yields 16α-methoxy - 11β - hydroxy-3,20-dioxo-1,4-pregnadien-21-yl acetate. Dehydration of the latter substance with methanesulfonyl chloride yields the Δ⁹⁽¹¹⁾ analogue which is treated successively with hydrobromous acid, potassium acetate and hydrogen fluoride and then hydrolyzed with acid as described above. In this manner, one obtains 9α-fluoro-16α-methoxy-11β,21-dihydroxy-1,4-pregnadiene-3,20-dione which may be employed as a substrate for the organism *Cephalothecium roseum* to produce 9α-fluoro-16α-methoxy-11β,17α,21-trihydroxy-1,4-pregnadiene-3,20-dione.

A still further technique for the production of the compounds of our invention utilizes the reaction of diazomethane in the presence of boron trifluoride whereby an alcohol is transformed to an ether. As illustrative of this reaction scheme, one may prepare the bis-3,20-ethylenedioxy derivative of 9α-fluoro-11β,16α,17α,21-tetrahydroxy-4-pregnene-3,20-dione by use of ethylene glycol with paratoluenesulfonic acid as the catalyst. Treatment with acetic anhydride in the presence of pyridine then provides the corresponding 21-acetate. This bis-ethylenedioxy-21-acetate compound is then reacted with diazomethane in the presence of boron trifluoride. After hydrolysis of the ethylenedioxy moieties with hydrochloric acid in methanol, one obtains 9α-fluoro-16α-methoxy-11β,17α,21-trihydroxy - 4 - pregnene-3,20-dione, one of the compounds of our invention previously synthesized hereinbefore by a different mechanism.

The 6-methyl and 6-halo analogues of the novel corticoids of the invention may be readily produced. A typical procedure for the production of these compounds is detailed below.

16α-methoxy - 11β,17α,21 - trihydroxy - 4 - pregnene-3,20-dione is dissolved in benzene, for example, and then reacted with ethylene glycol in the presence of paratoluenesulfonic acid to yield the corresponding 3,20-bisethylene ketal, with the double bond shifting to give the Δ⁵ analogue. Epoxidation with a peracid as, for example, perphthalic acid, yields the corresponding 5α,6α-epoxy derivative (as well as the 5β,6β-epoxide). The 5α,6α-epoxide is then reacted with Grignard reagent (methyl magnesium iodide, for example) to provide the 5α-hydroxy-6β-methyl-3,20-bisethylene-ketal of the methoxyhydrocortisone. Hydrolysis with acetic acid (90%) yields 6β-methyl-16α-methoxy-11β,17α,21-trihydroxy-4-pregnene-3,20-dione. Alternatively, hydrolysis of the 3-ketal with oxalic acid in methanol provides the 3-oxo-5α-hydroxy-6β-methylsteroid which, upon treatment with hydrogen chloride in ethanol, is transformed directly into 6α-methyl-16α-methoxy - 11β,17α,21 - trihydroxy-4-pregnene-3,20-dione. The latter compound is also obtained by treatment of the above 3-oxo-Δ⁴-6β-methyl derivative with hydrogen chloride in ethanol. Treatment of the 16α-methoxy-6α-methylhydrocortisone with acetic anhydride, for example, yields the corresponding 21-acetate. By the series of transformations outlined previously, the 21-acetate derivative may be readily converted to the following compounds: 6α-methyl-16α-methoxy-17α-hydroxy-3,11,20-trioxo-4-pregnen-21-yl acetate; 6α-methyl-9α - fluoro-16α-methoxy-11β,17α-dihydroxy-3,20-doxo-4-pregnen-21-yl acetate; 6α-methyl-9α-fluoro-16α-methoxy-11β,17α,21-trihydroxy - 4 - pregnene - 3,20 - dione; 6α-methyl-16α-methoxy - 11β,17α,21 - trihydroxy-1,4-pregnadiene-3,20-dione; 6α-methyl-16α-methoxy-11β,17α-dihydroxy-3,20-dioxo-1,4-pregnadien - 21 - yl acetate; 6α-methyl-16α-methoxy - 17α - hydroxy-3,11,20-trioxo-1,4-pregnadien - 21 - yl acetate; 6α-methyl - 9α - chloro-16α-methoxy-11β,17α-dihydroxy - 3,20 - dioxo-1,4-pregnadien-21-yl acetate; 6α-methyl-9α-fluoro-16α-methoxy-11β,17α-dihydroxy-3,20-dioxo - 1,4 - pregnadien-21-yl acetate; 6α-methyl-9α-fluoro-16α-methoxy - 11β,17α,21 - trihydroxy-1,4-pregnadiene-3,20-dione; 6α-methyl - 9α - fluoro-16α-methoxy - 17α - hydroxy-3,11,20-trioxo-1,4-pregnadien-21-yl acetate; and 6α-methyl-9α-fluoro-16α-methoxy-17α,21-dihydroxy-1,4-pregnadien-3,11,20-trione.

The corresponding 6-fluoro or 6-chloro derivatives, by way of illustration, may be produced as follows: The 5α,6α-epoxide as obtained above, is treated with hydrogen fluoride to yield the 5α-hydroxy-6β-fluoro derivative. The hydrolysis as described above (i.e. oxalic acid) gives the 3,20-diketo analogue which, upon treatment with 90% acetic acid, followed by hydrogen chloride in ethanol, yields successively the 3-oxo-Δ⁴-6β-fluoro and then the 3-oxo-Δ⁴-6α-fluoro derivatives. Alternatively, in the manner described above, treatment of the 3-keto-5α-hydroxy compound with hydrogen chloride in ethanol yields the 16α-methoxy-6α-fluorohydrocortisone directly. Similarly, substitution of hydrogen chloride for hydrogen fluoride in the foregoing synthesis yields the 16α-methoxy-6α-chlorohydrocortisone derivative via the corresponding intermediates described above for the fluoro analogue. Furthermore, by the same series of transformations previously described, one may obtain the 6α-fluoro or 6α-chloro analogues of the 6α-methyl steroids listed above.

It is believed that the above as well as other features and objects of our invention will best be understood by reference to the following examples illustrating the actual preparation of novel compounds of the invention via various different syntheses:

*Example I*

Synthesis of the compound, 16α-methoxy-17α-hydroxy-3,11,20-trioxo-4-pregnen-21-yl acetate, as represented by the formula:

(I)
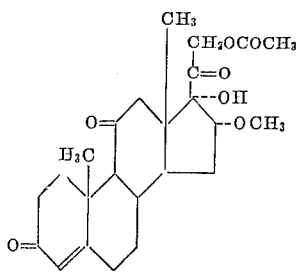

A. Preparataion of the intermediate, 16α-methoxy-3α-hydroxy-5β-pregnane-11,20-dione, as represented by the formula:

(II)
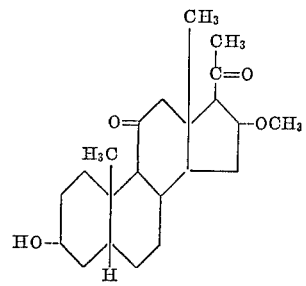

A solution consisting of 2.4 grams of 11,20-dioxo-5β-pregn-16-en-3α-yl acetate in 260 milliliters of a four percent (4%) methanolic potassium hydroxide solution was refluxed under nitrogen for 3 hours. The solution was cooled, evaporated to approximately 20 milliliters, and added to 120 milliliters of water. The resulting precipitate was filtered, washed with water, and, after drying, was crystallized from acetone-hexane, to yield the desired 16α-methoxy - 3α - hydroxy - 5β - pregnane-11,20-dione of Formula II.

B. Preparation of the intermediate, 16α-methoxy-11,20-dioxo-5β-pregnan-3α-yl acetate, as represented by the formula:

(III)
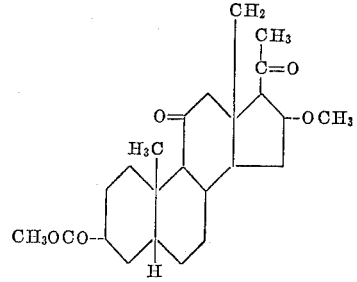

To one (1) gram of the 16α-methoxy-3α-hydroxy-5β-pregnane-11,20-dione of step A, there were added 5 milliliters of pyridine and 2 milliliters of acetic anhydride under anhydrous conditions. The reaction solution was permitted to remain at room temperature for 24 hours and then diluted with 30 milliliters of water. The precipitate thereby formed was filtered, washed with water and dried. Crystallization from aqueous methanol yielded the desired 16α-methoxy-substituted 3α-acetate steroid of Formula III.

C. Preparation of the intermediate, 16α-methoxy-20- cyano-20-hydroxy-11-oxo-5β-pregnan-3α-yl acetate, as represented by the formula:

(IV)

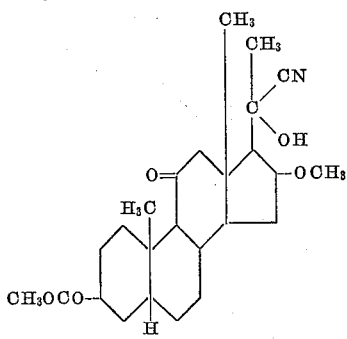

To a solution consisting of 1.9 grams of the intermediate of Formula III in 19 milliliters of ethanol and 7.0 milliliters of acetic acid maintained at approximately 0° C., there were added 6.5 grams of potassium cyanide. The mixture was stirred for 80 minutes and allowed to warm to room temperature. The stirred mixture was thereafter permitted to remain at room temperature for 4 hours, diluted with water to obtain a precipitate which was collected by filtration and washed with water. The crude cyanohydrin was then crystallized from ethyl acetate-hexane to yield the desired compound of Formula IV.

D. Preparation of the intermediate, 16α-methoxy-20-cyano-11-oxo-5β-pregn-17(20)-en-3α-yl acetate, as represented by the formula:

(V)

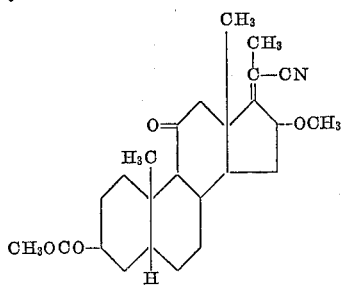

To a solution of 5 milliliters of pyridine containing 1.4 grams of the compound of Formula IV, there was added 0.7 milliliter of phosphorus oxychloride. After standing at room temperature for 18 hours, water was added, and the resulting precipitate was thereafter washed with water and dried. Crystallization from aqueous ethanol yielded the desired steroid of Formula V.

E. Preparation of the intermediate, 16α-methoxy-3α,17α-dihydroxy-5β-pregnane-11,20-dione, as represented by the formula:

(VI)

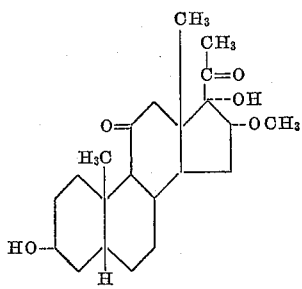

The compound of Formula V, in amount 0.87 gram, was dissolved in 10 milliliters of dry benzene and 0.4 milliliter of pyridine. Osmium tetroxide, in amount 1.0 gram, was added and the solution stirred for 18 hours at room temperature. A solution of 2.0 grams of sodium sulfite in 30 milliliters of water was then added and the mixture was stirred for one hour. The organic phase was separated and concentrated under vacuum to a volume of approximately 3 milliliters. Ethanol, in amount 30 milliliters, was then added and the mixture was stirred at room temperature overnight, filtered, made acid with acetic acid and then concentrated under vacuum to a volume of approximately 5 milliliters. Water was then added and the mixture extracted with methylene chloride. The organic phase was dried over magnesium sulfate, filtered, and the filtrate evaporated to dryness under vacuum. The crude residue thus obtained was crystallized from acetone-hexane to yield the desired 16α-methoxy-3α,17α-dihydroxy-5β-pregnane-11,20-dione of Formula VI.

The corresponding 3-acetate of the foregoing compound may be produced by treating, for example, 1.0 gram with 0.5 gram of acetic anhydride in 2.5 milliliters of pyridine for 4 hours. Upon the addition of water, a precipitate is formed which is separated by filtration and dried. Crystallization from acetone-hexane yields the desired acetate derivative, namely 16α-methoxy-17α-hydroxy-11,20-dioxo-5β-pregnan-3α-yl acetate.

F. Preparation of the intermediate, 16α-methoxy-3α,17α-dihydroxy-11,20-dioxo-5β-pregnan-21-yl acetate, as represented by the formula:

(VII)

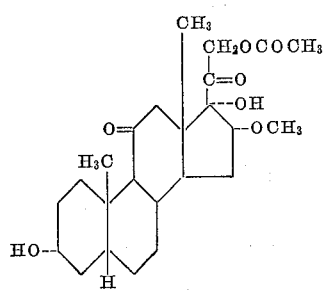

A solution consisting of 0.38 gram of the compound of Formula VI in 19 milliliters of C.P. chloroform (to which there was added a few drops of chloroform saturated with hydrogen bromide) was cooled to −25° C. Bromine (0.164 gram) in 11 milliliters of chloroform was added dropwise over a period of 2 hours. The chloroform solution was then washed with water and evaporated under reduced pressure to a residue to which was added one gram of sodium acetate and 10 milliliters of dimethylformamide. The mixture was stirred at 65° C. for 4 hours and then allowed to stand overnight at room temperature. The mixture was thereafter poured into water and the resulting solid filtered and dried. Crystallization from acetone-hexane yielded the desired acetate of Formula VII.

G. Preparation of the intermediate, 16α-methoxy-17α-hydroxy-3,11,20-trioxo-5β-pregnan-21-yl acetate, as represented by the formula:

(VIII)

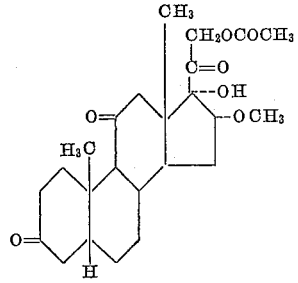

A solution consisting of 370 milligrams of the compound of Formula VII in 35 milliliters of 80% acetone-water solution was cooled to 10° C. N-bromosuccinimide, in amount 155 milligrams, together with one drop of concentrated hydrochloric acid were added and the mixture was maintained in the dark at 10° C. for 23 hours. Sodium sulfite solution was added until starch iodide paper was negative. The mixture was then concentrated under reduced pressure to a small volume. Water was then added and the precipitated solid separated by filtration and dried, whereby there was obtained an impure form of the desired acetate. Purification of this impure substance was effected by treatment with zinc dust in aqueous acetone containing a few drops of acetic acid. The zinc was removed by filtration and the filtrate then concentrated to a small volume. Addition of water yielded the desired compound of Formula VIII.

H. Preparation of the intermediate, 4-bromo-16α-methoxy-17α-hydroxy-3,11,20-trioxo-5β-pregnan-21-yl acetate, as represented by the formula:

(IX)

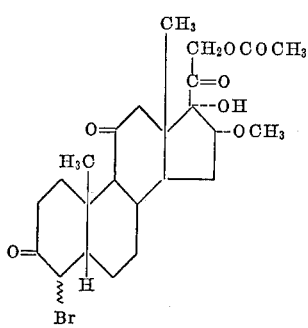

A solution consisting of 64 milligrams of bromine in 6 milliliters of tertiary-butyl alcohol was added to 173 milligrams of the compound of Formula VIII contained in 6 milliliters of tertiary-butyl alcohol and 6 milliliters of methylene chloride. The reaction solution was maintained at 30–35° C. until the bromination was complete (approximately 3 hours). The solution was then evaporated to dryness under reduced pressure and the residue slurried with water. The resultant precipitate was collected on a Büchner funnel, washed with water and dried. In this manner, there was obtained the desired acetate of Formula IX which may be used directly, or initially purified, and thereafter subjected to the following final transformation.

I. Preparation of the desired 16α-methoxy-17α-hydroxy-3,11,20-trioxo-4-pregnen-21-yl acetate of formula I:

The compound of Formula IX, in amount of 180 milligrams, was dissolved in a mixture of 8 milliliters of tertiary-butyl alcohol and 4 milliliters of methylene chloride. Eighty (80) milligrams of semicarbazide were added and the reaction solution was stirred under an atmosphere of nitrogen for 2 hours at 25–30° C. The solvent was removed under reduced pressure and the residue dissolved in 12 milliliters of 80% acetic acid-water solution. Pyruvic acid (70%), in an access, was then added and the mixture was allowed to remain at room temperature for 23 hours. Dilute sodium hydroxide (5%) was added until the pH was adjusted to approximately 7.0. Water was added and the mixture extracted with methylene chloride. The combined methylene chloride extracts were evaporated to dryness and the residue subjected to chromatographic resolution on activated magnesium silicate. The fractions collected between 50% ether-in-hexane and ether were evaporated and crystallized from acetone-hexane, thereby yielding the desired compound of Formula I ($\lambda_{max.}^{MeOH} = 239$ mμ)

*Example II*

Synthesis of the compound, 16α-methoxy-17α,21-dihydroxy-4-pregnene-3,11,20-trione, as represented by the formula:

(X)

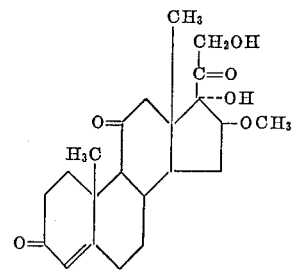

One gram of the acetate of Formula I was dissolved in 30 milliliters of methanol and 5 milliliters of water containing 0.2 gram of potassium bicarbonate. This solution was refluxed for 30 minutes, and then concentrated under reduced pressure. Water was then added to the residue and the resulting precipitate filtered and dried. Crystallization from acetone-ketone yielded the desired compound of Formula X.

*Example III*

Synthesis of the compound, 16α-methoxy-11β,17α,21-trihydroxy-4-pregnene-3,20-dione, as represented by the formula:

(XI)

A. Preparation of the intermediate, 16α-methoxy-3,20-bis(semicarbazono) - 17α,21 - dihydroxy - 4 - pregnene-11-one, as represented by the formula:

(XII)

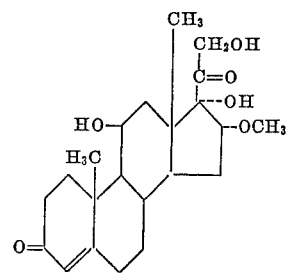

A mixture consisting of 5.0 grams of the compound of Formula X (Example II), 8.5 grams of semicarbazide hydrochloride, 6 grams of pyridine, 50 milliliters of water and 200 milliliters of methanol was refluxed for 17 hours. The solution was concentrated to about 50 milliliters, and then poured into water to precipitate the desired bis-semicarbazone derivative of Formula XII.

B. Preparation of the intermediate, 16α-methoxy-3,20-bis(semicarbazono)-4-pregnene-11β,17α,21-triol, as represented by the formula:

(XIII)

A solution consisting of 6.0 grams of the bis-semicarbazone of Formula XII, 4.0 grams of potassium borohydride in 200 milliliters of tetrahydrofuran and 100 milliliters of water was refluxed for 6 hours. The solution was cooled and acetic acid was added to approximately pH 5.5. The organic solvent was removed under reduced pressure and the solids in the residue were filtered to yield the desired compound of Formula XIII.

C. Preparation of the 16α-methoxy-11β,17α,21-trihydroxy-4-pregnene-3,20-dione of Formula XI:

Five (5) grams of the intermediate of Formula XIII were dissolved under nitrogen atmosphere in 250 milliliters of 2.4 N-hydrochloric acid. The solution was cooled to 5° C., and 2.5 grams of sodium nitrite in 25 milliliters of water were added over a fifteen (15) minute period at 5° C. The reaction mixture was stirred an additional 30 minutes, then cooled to below 15° C., neutralized with 20% sodium hydroxide, and extracted several times with chloroform. The solvent was evaporated under reduced pressure to give a solid residue which, after crystallization from acetone-hexane, yielded the desired hydrocortisone derivative of Formula XI.

*Example IV*

Synthesis of the compound 16α-methoxy-11β,17α-dihydroxy-3,20-dioxo-4-pregnen-21-yl acetate, as represented by the formula:

(XIV)

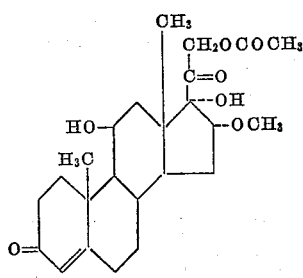

To one (1) gram of the compound of Formula XI, there was added 0.6 milliliter of acetic anhydride in 2.4 milliliters of pyridine. After standing for 3 hours at room temperature, the mixture was poured into ice and hydrochloric acid. The resulting precipitate was filtered and recrystallized from aqueous methanol to yield the desired acetate derivative of Formula XIV.

*Example V*

Synthesis of the compound, 9α-bromo-16α-methoxy-11β,17α-dihydroxy-3,20-dioxo-4-pregnen-21-yl acetate, as represented by the formula:

(XV)

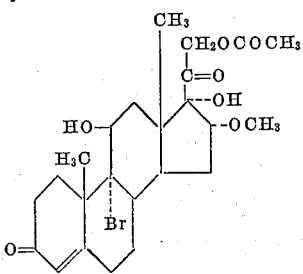

A. Preparation of the intermediate, 16α-methoxy-17α-hydroxy-3,20-dioxo-4,9(11)-pregnadiene-21-yl acetate, as represented by the formula:

(XVI)

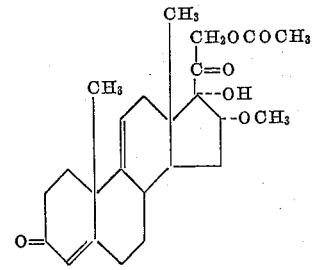

To a solution consisting of 0.6 gram of the compound of Formula XIV of Example IV in 10 milliliters of pyridine there was added 0.4 milliliter of methanesulfonyl chloride in 6.0 milliliters of pyridine. The solution was allowed to stand for 12 hours and was then poured into ice-hydrochloric acid. A solid precipitated which was recovered by filtering. Crystallization from acetone-hexane yielded the desired intermediate of Formula XVI.

B. Preparation of the 9α-bromo-16α-methoxy-11β,17α-dihydroxy-3,20-dioxo-4-pregnen-21-yl acetate of Formula XV:

Purified dioxane, in amount 40 milliliters, was added to 0.4 gram of the intermediate of Formula XVI, followed by the addition of 4 milliliters of water, 0.2 gram of N-bromo-acetamide and 2 milliliters of 1.5 N-perchloric acid. The mixture was stirred for 3 hours, and then 0.4 gram of sodium sulfite in 4 milliliters of water was added and the mixture extracted with methylene chloride. The organic extracts were washed with water, dried and evaporated to a solid residue which was crystallized from acetone-hexane to yield the desired compound of Formula XV.

*Example VI*

Synthesis of the compound, 9α-bromo-16α-methoxy-11β,17α,21-trihydroxy-4-pregnene-3,20-dione, as represented by the formula:

(XVII)

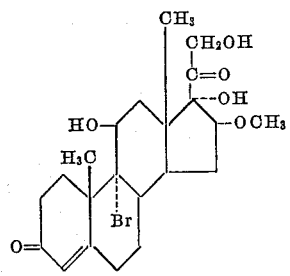

A mixture of one (1) gram of the acetate of Formula XV, Example V, in 200 milliliters of methanol, 40 milliliters of chloroform, 10 milliliters of water, and 10 milliliters of concentrated hydrochloric acid was permitted to stand at room temperature for 48 hours. Water was then added and the mixture extracted with methylene chloride. The organic extracts were washed with water, dried and then concentrated to a residue. Crystallization from acetone yielded the desired steroid of Formula XVII.

*Example VII*

Synthesis of the compound, 9α-fluoro-16α-methoxy-11β, 17α-dihydroxy-3,20-dioxo-4-pregnen-21-yl acetate, as represented by the formula:

(XVIII)

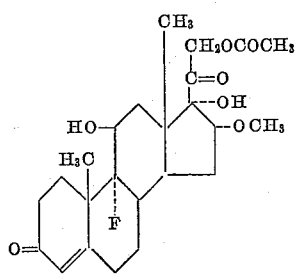

A. Preparation of the intermediate, 9β,11β-epoxy-16α- methoxy-17α-hydroxy-3,20-dioxo-4-pregnen-21-yl acetate, as represented by the formula:

(XIX)

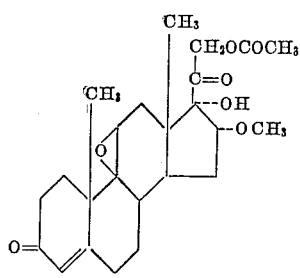

To 0.6 gram of the compound of Formula XV, Example V, in 40 milliliters of ethanol, there was added 0.6 gram of potassium acetate. The mixture was refluxed for 6 hours, and then concentrated under reduced pressure to a residue which was treated with water. The solid material present was filtered-off and dried. Crystallization from acetone-hexane yielded the desired 9β,11β-epoxy derivative of Formula XIX.

B. Preparation of the 9α-fluoro-16α-methoxy-11β,17α-dihydroxy - 3,20 - dioxo-4-pregnen-21-yl acetate of Formula XVIII:

To a solution containing 0.5 gram of the compound of Formula XIX in 20 milliliters of alcohol-free chloroform at 0° C., there was added an aliquot of 32.2 milliliters of a solution consisting of hydrogen fluoride in alcohol-free chloroform and tetrahydrofuran (prepared by dissolving 41.4 grams of hydrogen fluoride in 65.3 milliliters of tetrahydrofuran and 31.5 milliliters of ethanol-free chloroform). The mixture was permitted to stand for 4 hours at 0° C., and was then poured into ice-water. The pH was adjusted to 7 with sodium bicarbonate, and the mixture then extracted with methylene chloride. The organic extracts were evaporated under reduced pressure to a residue which, upon crystallization from acetone-hexane, yielded the desired compound of Formula XVIII.

*Example VIII*

Synthesis of the compound, 9α-chloro-16α-methoxy-11β,17α-dihydroxy-3,20-dioxo-4-pregnen-21-yl acetate, as represented by the formula:

(XX)

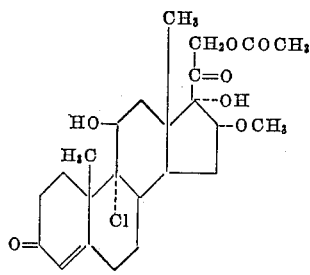

A solution consisting of 0.4 gram of the 9β,11β-epoxy derivative of Formula XIX, Example VII-A in 60 milliliters of alcohol-free chloroform was saturated at 0° C. with anhydrous chloride and the mixture permitted to stand at 0° C. for six (6) hours. The solvent was distilled under reduced pressure and the remaining residue crystallized from acetone-water to yield the desired compound of Formula XX.

*Example IX*

Synthesis of the compound, 9α-fluoro-16α-methoxy-11β, 17α-21-trihydroxy-4-pregnene-3,20-dione, as represented by the formula:

(XXI)

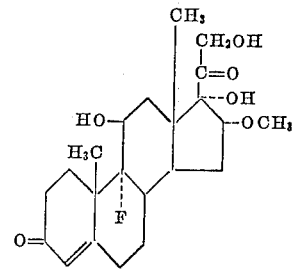

In exactly the same manner as previously described in Example VI, 1.0 gram of the acetate of Formula XVIII, Example VII was hydrolyzed to the steriod alcohol of Formula XXI.

*Example X*

Synthesis of the compound, 16α-methoxy-17α-hydroxy-3,11,20-trioxo-1,4-pregnadien-21-yl acetate, as represented by the formula:

(XXII)

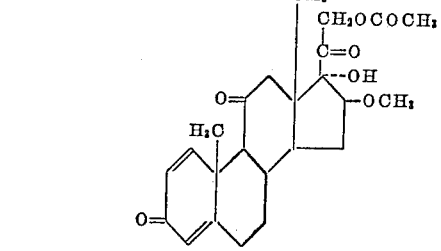

A. Preparation of the intermediate, 2,4-dibromo-16α-methoxy - 17α-hydroxy-3,11,20-trioxo-5β-pregnan-21-yl acetate, as represented by the formula:

(XXIII)

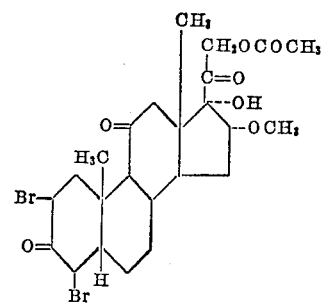

To a solution of 234 milligrams of the compound of Formula VIII, Example I-G, in 6 milliliters of dioxane, there was rapidly added 260 milliliters of bromine contained in 2 milliliters of dioxane. The 2,4-dibromide thus formed was precipitated by the addition of water and then separated by filtering. The resulting compound of Formula XXIII thus produced was of sufficient purity for use in the conversion described in step B below.

B. Preparation of the 16α-methoxy-17α-hydroxy-3,11,20-trioxo-1,4-pregnadien-21-yl acetate of Formula XXII.

To 4 milliliters of refluxing dimethylformamide containing 20 milligrams of calcium carbonate, there were added 180 milligrams of the compound of Formula XXIII. After two (2) hours of reflux, the mixture was cooled and poured into dilute hydrochloric acid. The resulting mixture was extracted with methylene chloride and the organic extracts evaporated to a solid residue which was then subjected to chromatographic resolution on activated magnesium silicate. The fractions obtained by elution with 30% ether in hexane to 70% ether in hexane were collected and, upon treatment with acetone-hexane, yielded the desired compound of Formula XXII.

Example XI

Synthesis of the compound, 16α-methoxy-17α,21-dihydroxy-1,4-pregnadiene-3,11,20-trione, as represented by the formula:

(XXIV)

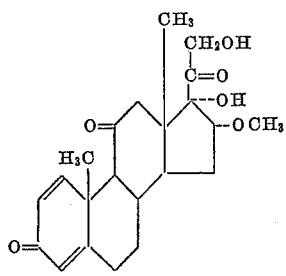

A. The compound of Formula XXII, Example X–B, in amount 0.5 gram, was hydrolyzed with aqueous alcoholic potassium bicarbonated in the manner described in Example II to yield the desired compound of Formula XXIV above.

B. In an alternate synthesis for the compound of formula XXIV, the microorganism *Bacillus sphaericus* var. fusiformis (A.T.C.C. 7055) was incubated on a nutrient medium of the following composition for 24 hours at 28° C.:

| | | |
|---|---|---|
| Bacto-beef extract | grams | 3 |
| Bacto-peptone | do | 5 |
| Sodium chloride | do | 8 |
| Agar | do | 15 |
| Tap water | liter | 1 |

To 100 milliliters of a sterile nutrient broth consisting of 3 grams of Bacto-beef extract and 5 grams of Bacto-peptone per liter of tap water, contained in a 300 milliliters flask, was added one loopful of the incubated culture as prepared above, and the broth mixture was further incubated for 24 hours at 28° C. on a shaking machine. The broth culture thus produced was employed as an inoculum (1%).

Into each of ten (10) flasks containing 100 milliliters of sterile nutrient broth, was added 1 milliliter of the inoculum. The flasks were agitated on a shaker for 8 hours at 28° C. at 240 strokes per minute. After this growth period, a solution of 25 milligrams of the 16α-methoxy-17α,21-dihydroxy-4-pregnene-3,11,20-trione (Formula X) of Example II in 0.5 milliliter of methanol, was added to each flask under aseptic conditions. The flasks were agitated again and incubated for an additional 24 hours. The final pH was 7.8.

The contents of the flasks were then combined and extracted three (3) times with 2 liters of chloroform per extraction. The combined chloroform extracts were evaporated to dryness to yield 300 milligrams of crude product. The crude steroid was crystallized from acetone to yield the desired compound of Formula XXIV.

Example XII

Synthesis of the compound, 16α-methoxy-11β,17α,21-trihydroxy-1,4-pregnadiene-3,20-dione, as represented by the formula:

(XXV)

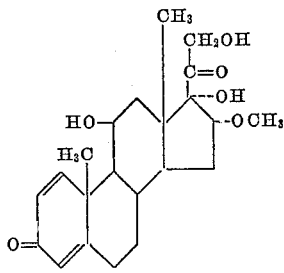

The compound of Formula XI (Example III), in amount of 250 milligrams, was fermented by means of the microorganism *Bacillus sphaericus* var. *fusiformis* (A.T.C.C. 7055) in the manner described in Example XI–B to yield the desired prednisolone derivative of Formula XXV.

Example XIII

Synthesis of the compound, 16α-methoxy-11β,17α-dihydroxy-3,20-dioxo-1,4-pregnadien-21-yl acetate, as represented by the formula:

(XXVI)

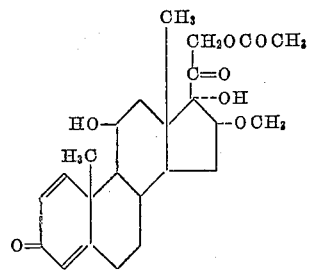

The compound of Formula XXV (Example XII), in amount 1.0 gram, was treated with 0.6 milliliter of acetic anhydride and 2.4 milliliters of pyridine in the manner described in Example IV to yield the methoxy-prednisolone acetate derivative of Formula XXVI.

Example XIV

Synthesis of the compound, 16α-methoxy-17α-hydroxy-3,11,20-trioxo-1,4-pregnadien-21-yl propionate, as represented by the formula:

(XXVII)

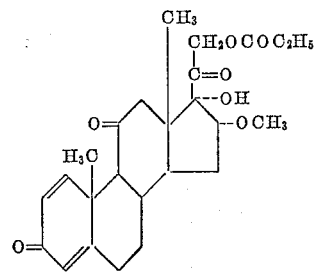

The compound of Formula XXIV (Example XI), in amounts 1.0 gram, was reacted with propionic anhydride in pyridine in the manner described in Example IV to yield the compound of Formula XXVII.

Example XV

Synthesis of the command, 9α-bromo-16α-methoxy-11β,17α-dihydroxy-3,20-dioxo-1,4-pregnadien-21-yl acetate, as represented by the formula:

(XXVIII)

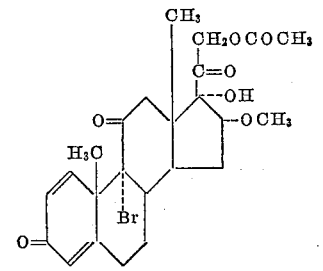

A. Preparation of the intermediate, 16α-methoxy-17α-hydroxy-3,20-dioxo-1,4,9(11)-pregnatrien-21-yl acetate, as represented by the formula:

(XXIX)

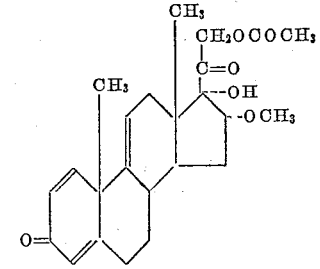

A solution consisting of 0.5 gram of the compound of Formula XXVI (Example XIII), in 3 milliliters of pyridine was reacted with 0.3 milliliter of methanesulfonyl chloride in 5 milliliters of pyridine. The solution was allowed to stand for 15 hours and was then poured into ice-hydrochloric acid. A solid precipitate formed which was recovered by filtration and crystallized from acetone-hexane to yield the desired intermediate of Formula XXIX.

B. Preparation of the 9α-bromo-16α-methoxy-11β,17α-dihydroxy-3,20-dioxo-1,4-pregnadien-21-yl acetate of Formula XXVII:

To a suspension of 1.0 gram of the compound of Formula XXIX in 100 milliliters of purified dioxane were added 10 milliliters of water, 0.4 gram of N-bromoacetamide and 4 milliliters of 1.5 N perchloric acid. The mixture was agitated for 4 hours, and thereafter 1.0 gram of sodium sulfite in 10 milliliters of water was added, and the reaction mixture was extracted with methylene chloride. The organic extracts were washed with water, dried over magnesium sulfate, filtered and evaporated. The resulting solid was crystallized from acetone to yield the desired compound of Formula XXVIII.

*Example XVI*

Synthesis of the compound, 9α-fluoro-16α-methoxy-11β,17α-dihydroxy - 3,20 - dioxo - 1,4 - pregnadien-21-yl acetate, as represented by the formula:

(XXX)

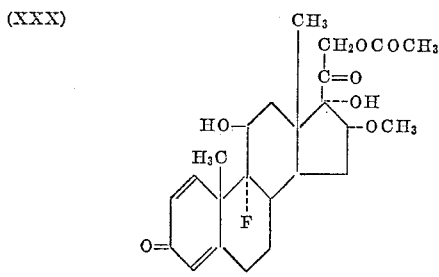

A. Preparation of the intermediate, 9β,11β-epoxy-16α-methoxy-17α-hydroxy - 3,20 - dioxo-1,4-pregnadien-21-yl acetate, as represented by the formula:

(XXXI)

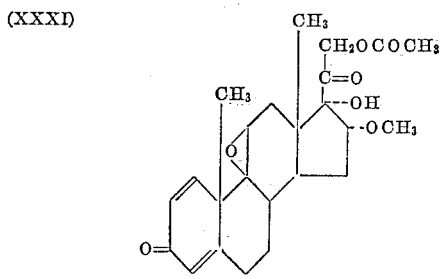

One (1) gram of the compound of Formula XXVIII (Example XV) was added to 70 milliliters of acetone and 1.0 gram of potassium acetate and the mixture refluxed for 5 hours and then concentrated to a residue. Water was added to the residue and the resulting solid was recovered by filtration and then crystallized from methanol-water to give the desired intermediate of Formula XXXI.

B. Preparation of the 9α-fluoro-16α-methoxy-11β,17α-dihydroxy-3,20-dioxo-1,4-pregnadien-21-yl acetate of Formula XXX:

A solution consisting of 0.8 gram of the intermediate of Formula XXXI was treated with hydrogen fluoride in the manner described in Example XI-B to yield the desired compound of Formula XXX.

*Example XVII*

Synthesis of the compound, 9α-fluoro-16α-methoxy-11β,17α,21-trihydroxy-1,4-pregnadiene-3,20-dione, as represented by the formula:

(XXXII)

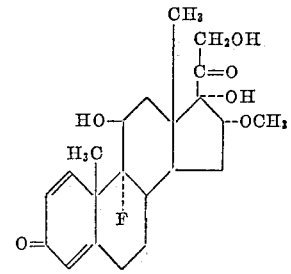

The compound of Formula XXX (Example XVI), in amount 1.0 gram, was converted to the desired steroid of Formula XXXII by means of hydrochloric acid in methanol-chloroform-water in the manner described in Example VI.

*Example XVIII*

Synthesis of the compound, 9α-bromo-16α-methoxy-11β,17α,21-trihydroxy-1,4-pregnadiene-3,20-dione, as represented by the formula:

(XXXIII)

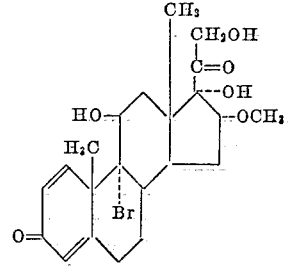

The compound of Formula XXVIII (Example XV) was converted to the desired compound of Formula XXXIII by means of hydrochloric acid in methanol-chloroform-water in the manner described in Example VI.

*Example XIX*

Synthesis of the compound, 9α-chloro-16α-methoxy-11β,17α-dihydroxy - 3,20 - dioxo - 1,4 - pregnadien-21-yl acetate, as represented by the formula:

(XXXIV)

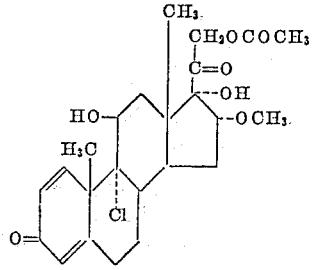

The compound of Formula XXXI (Example XVI-A), in amount 1.0 gram, was treated with gaseous hydrogen chloride in the manner described in Example VIII to yield the desired compound of Formula XXXIV.

*Example XX*

Synthesis of the compound, 9α-chloro-16α-methoxy-11β,17α,21-trihydroxy-1,4-pregnadiene-3,20-dione, as represented by the formula:

(XXXV)

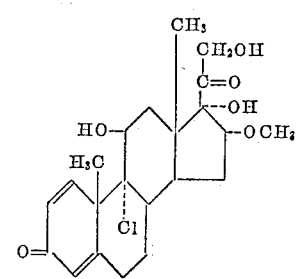

By the same procedure as described in Example VI, the acetate of Formula XXXIV (Example XIX), in amount 0.5 gram, was converted to the desired compound of Formula XXXV.

Example XXI

Synthesis of the compound, 9α-fluoro-16α-methoxy-17α - hydroxy - 3,11,20 - trioxo - 1,4 - pregnadien - 21 - yl-acetate, as represented by the formula:

(XXXVI)

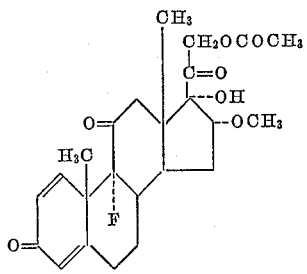

To a solution consisting of 0.6 gram of the compound of Formula XXX (Example XVI) in 30 milliliters of acetic acid there was added dropwise a solution of 120 milligrams of chromium trioxide in 2 milliliters of water and 6 milliliters of acetic acid. The reaction solution was permitted to stand for 5 hours, then diluted with water and finally extracted with methylene chloride. The organic extracts were washed with water, dried over magnesium sulfate, filtered and finally evaporated to a residue which, upon treatment with acetone, yields the desired compound of Formula XXXVI.

Example XXII

Synthesis of the compound, 9α-fluoro-16α-methoxy-17α-21-dihydroxy-1,4-pregnadiene-3,11,20-trione, as represented by the formula:

(XXXVII)

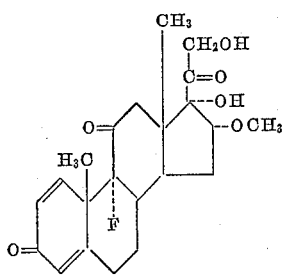

In exactly the same manner, as described in Example II, the compound of Formula XXXVI (Example XXI), in amount 1.0 gram, was saponified with potassium bicarbonate to yield the desired steroid of Formula XXXVII.

Example XXIII

Synthesis of the compound, 9α-chloro-16α-methoxy-17α - hydroxy - 3,11,20 - trioxo - 1,4 - pregnadien - 21 - yl acetate, as represented by the formula:

(XXXVII)

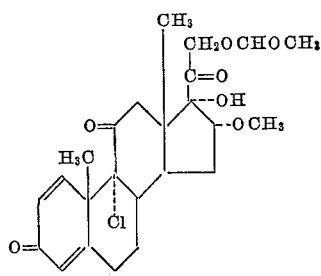

The compound of Formula XXXIV (Example XIX), in amount 0.6 gram, was reacted with chromium trioxide in aqueous acetic acid in the manner described in Example XXI to yield the desired steroid of Formula XXXVII.

Example XXIV

Synthesis of the compound, 9α-chloro-16α-methoxy-17α,21-dihydroxy-1,4-pregnadiene-3,11,20-trione, as represented by the formula:

(XXXVIII)

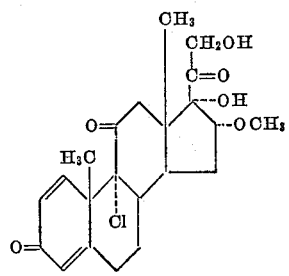

In exactly the same manner as previously described for the synthesis of Example VI, 1.0 gram of the compound of Formula XXXVII (Example XXIII) was converted by reaction with hydrochloric acid in methanol-chloroform-water to the desired steroid of Formula XXXVIII.

Example XXV

Synthesis of the compound, 9α-bromo-16α-methoxy-17α - hydroxy - 3,11,20 - trioxo - 1,4 - pregnadien - 21 - yl acetate, as represented by the formula:

(XXXIX)

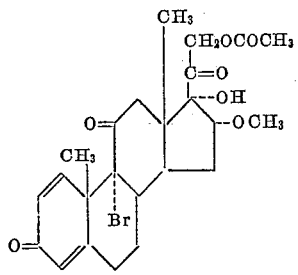

In the same manner as described in connection with the synthesis of Example XXI, 0.6 gram of the compound of Formula XXVIII (Example XV), was reacted with chromium trioxide in aqueous acetic acid to yield the acetate derivative of Formula XXXIX.

EXAMPLE XXVI

Synthesis of the compound, 9α-bromo-16α-methoxy-17α,21 - dihydroxy - 1,4 - pregnadiene - 3,11,20 - trione, as represented by the formula:

(XL)

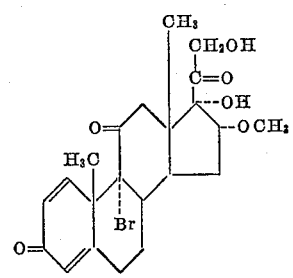

In the manner described for the synthesis of Example VI, 1.2 grams of the compound of Formula XXXIX (Example XXV) was reacted with hydrochloric acid in methanol-chloroform-water to yield the desired steroid of Formula XL.

Having thus described the subject matter of our invention, what it is desired to secure by Letters Patent is:

1. A 16-alkoxy steroid selected from the group consisting of compounds represented by the formulae:

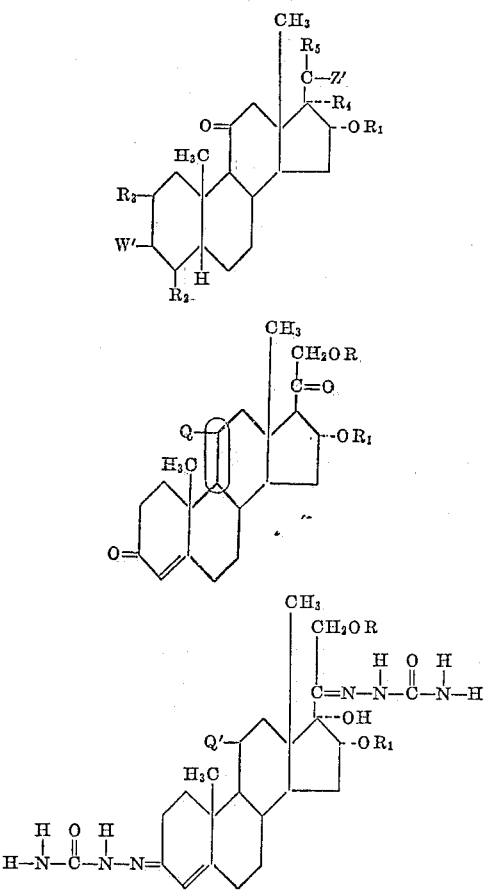

and

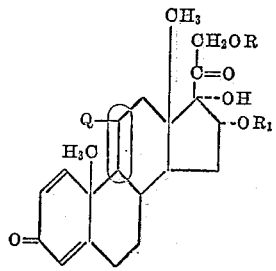

wherein W' is a member selected from the group consisting of oxygen, hydroxy and acetoxy; Z' is a member selected from the group consisting of oxygen, cyanohydrin and cyano—in which case the C–17: C–20 bond is olefinic and replaces $R_4$; Q is an arrangement of atoms about the C–9: C–11 positions selected from the group consisting of

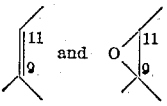

Q' is a member selected from the group consisting of oxygen and hydroxy; R is a member of the group consisting of hydrogen and lower acyl radicals; $R_1$ is a lower alkyl radical; $R_2$ and $R_3$ are each members selected from the group consisting of hydrogen and bromine; $R_4$ is a member selected from the group consisting of hydrogen and hydroxy; and $R_5$ is a member selected from the group consisting of methyl and lower acyloxymethyl radicals.

2. The chemical compound 16α-methoxy-3α-hydroxy-5β-pregnane-11,20-dione.
3. The chemical compound 16α-methoxy-11,20-dioxo-5β-pregnan,3α-yl acetate.
4. The chemical compound 16α-methoxy-20-cyano-20-hydroxy-11-oxo-5β-pregnan-3α-yl acetate.
5. The chemical compound 16α-methoxy-20-cyano-11-oxo-5β-pregn-17(20)-en-3α-yl acetate.
6. The chemical compound 16α-methoxy-3α,17α-dihydroxy-5β-pregnane-11,20-dione.
7. The chemical compound 16α-methoxy-3α,17α-dihydroxy-11,20-dioxo-5β-pregnan 21-yl acetate.
8. The chemical compound 16α-methoxy-17α-hydroxy-3,11,20-trioxo-5α-pregnan-21,yl acetate.
9. The chemical compound 4-bromo-16α-methoxy-17α-hydroxy-3,11,20-trioxo-5β-pregnan-21-yl acetate.
10. The chemical compound 16α-methoxy-3,20-bis-(semicarbazono)-17α,21-dihydroxy-4-pregnene-11-one.
11. The chemical compound 16α-methoxy-3,20-bis-(semicarbazono)-4-pregnene-11β,17α,21-triol.
12. The chemical compound 16α-methoxy-17α-hydroxy-3,20-dioxo-4,9(11)-pregnadien-21-yl acetate.
13. The chemical compound 9β,11β-epoxy-16α-methoxy-17α-hydroxy-3,20-dioxo-4-pregnen-21-yl acetate.
14. The chemical compound 2,4-dibromo-16α-methoxy-17α-hydroxy-3,11,20-trioxo-5β-pregnan-21-yl acetate.
15. The chemical compound 16α-methoxy-17α-hydroxy-3,20-dioxo-1,4,9(11)-pregnatrien-21-yl acetate.
16. The chemical compound 9β,11β-epoxy-16α-methoxy-17α-hydroxy-3,20-dioxo-1,4-pregnadien-21-yl acetate.

References Cited in the file of this patent
UNITED STATES PATENTS
2,946,812    Fried et al. _____ July 26, 1960